United States Patent [19]
Ruus et al.

[11] 3,869,232
[45] Mar. 4, 1975

[54] APPARATUS FOR PREPARING PELLETS BY MEANS OF BEAMS OF CHARGED PARTICLES

[75] Inventors: Waldemar Ruus, Somborn; Herbert Stephan, Bruchkoebel, both of Germany

[73] Assignee: Leybold-Heraeus Verwaltung GmbH, Koln-Bayental, Germany

[22] Filed: June 13, 1973

[21] Appl. No.: 369,435

Related U.S. Application Data
[62] Division of Ser. No. 124,330, March 15, 1971.

[52] U.S. Cl. ............................ 425/6, 264/5, 264/13, 264/25
[51] Int. Cl. ...................... B29c 23/00, B22d 23/08
[58] Field of Search ................ 264/5, 9, 13, 25, 40; 425/6

[56] References Cited
UNITED STATES PATENTS

| | | | |
|---|---|---|---|
| 2,790,019 | 4/1957 | Stalego | 425/6 UX |
| 2,793,282 | 5/1957 | Steigerwald | 264/25 |
| 3,265,779 | 8/1966 | Gobla et al. | 425/6 X |
| 3,646,175 | 2/1972 | Bomberger, Jr. et al. | 264/8 |
| 3,702,748 | 11/1972 | Storb et al. | 425/6 |
| 3,744,943 | 7/1973 | Bomberger, Jr. et al. | 425/6 |

*Primary Examiner*—Robert L. Spicer, Jr.
*Attorney, Agent, or Firm*—Joseph F. Padlon

[57] ABSTRACT

Pellets are prepared by melting raw material by beams of charged particles in a vacuum or under protective gas coverage with subsequent cooling and solidification of the pellets.

4 Claims, 5 Drawing Figures

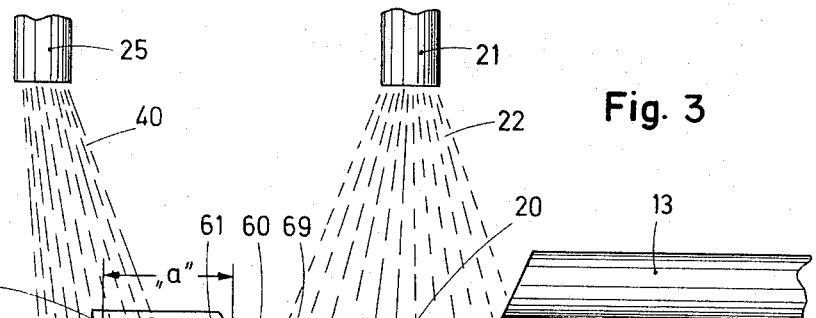
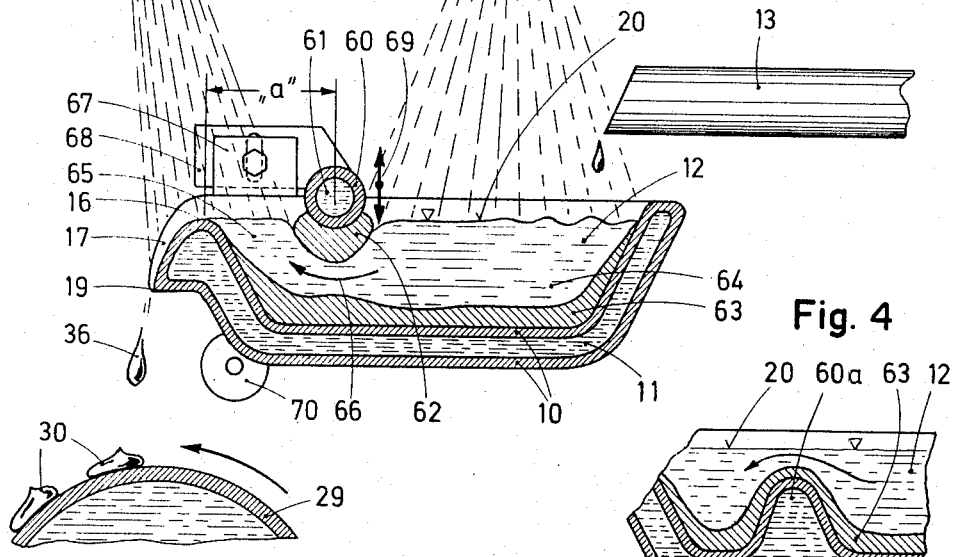
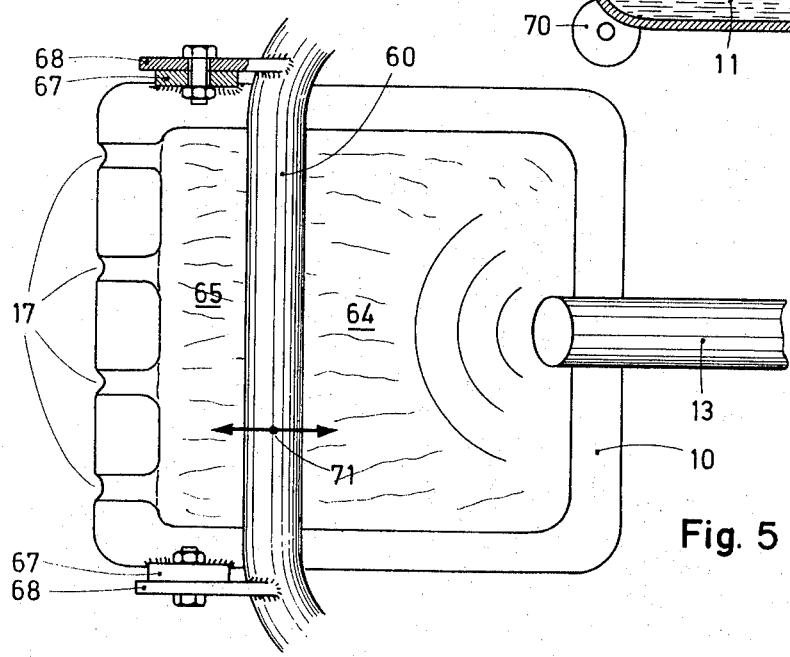

APPARATUS FOR PREPARING PELLETS BY MEANS OF BEAMS OF CHARGED PARTICLES

This is a division, of application Ser. No. 124,330 filed Mar. 15, 1971.

This invention relates to a method and an apparatus for preparing pellets by melting a raw material by means of beams of charged particles in a vacuum or under a protective gas and subsequently solidifying individual drops of the melt on a cooled surface. The starting material is generally a metal, such as titanium, or an alloy, and the pellets may serve as a material from which electrodes for the melt refining process may be prepared. Such pellets are usually prepared from scrap or machining waste or particles and may be mixed with titanium sponge and thereafter shaped under pressure into the form of electrodes which are melted in a vacuum arc furnace. The addition of titanium sponge has the advantage that much lower pressures are required during the pressure forming step than would be needed in shaping the electrodes from pellets alone. The pellets have the shape of plates or solidified drops whose maximum dimensions are between 6 and 30 mm. Aside from electron beams, energy may also be supplied by plasma beams. When electron beams are employed, the pellets may contain high-melting non-metallic starting materials, such as metal oxides in addition to the metal.

A method of the type described is known from the French Pat. No. 1,359,671 and the patent of addition No. 84,316. In the known process, the starting material is fed to a melting zone in the form of a bar or rod, and drops are molten from the bar or rod by means of electron beams. A surface layer of molten material is formed on the end of the bar under the action of the electron beams and contracts into individual drops at the lowest point of the bar. The drops then fall on a cooled surface located immediately under the end of the bar. The surface may be constituted by an inclined plane or a rotating disc or cylinder. The molten drops rest or slide on the cooled surface for a certain time and then fall into a receptacle under the force of gravity. The proper operation of such a process requires the cooled surface to have satisfactory qualities and, particularly, to be free from roughness. When the surface roughness exceeds a certain measure, the individual pellets are not released from the cooled surface and block the same. The process thereby is arrested or hindered after a short time, and the cooling surface may be damaged so as to require replacement of the same.

It has now been found that the known process mentioned above is affected by the disadvantage or shortcoming of increasing roughness of the cooling surface during operation. This is due to the fact that vapors are released from the molten surface of the bar which is heated up to a high temperature. The vapors are condensed on the cooling surface and form a layer on the surface. The surface is struck by the charged particle beams which are unavoidably scattered, and the material deposited from the vapor is diffused into the cooling surface which is simultaneously roughened by the electron bombardment. As the cooling surface ages in service, this effect is enhanced so that the quality of the pellets deteriorates.

It is the primary object of this invention to improve the known process to the extent that the disadvantages enumerated above are avoided. In order to achieve this object, a molten puddle is first formed from the starting material in a container, and its surface is heated by means of beams of charged particles. The drops needed to form the pellets are taken from the melt. The container may be charged with and the melt puddle may be formed from material having the shape of a solid bar which is pushed into the beams of charged particles directed toward the container. It is also possible to provide the container with particulate starting material from a storage bin. The use of a container as an intermediate receptacle for the melt has the advantage of permitting greater spatial separation of the cooling surface and of the vapor releasing surface of the melt so that condensation of vapor on the cooling surface can be practically completely suppressed. Moreover, the rim of the melt container protects the cooling surface from scattered particle beams and the surface cannot be roughened by the impinging beams. The reliability of the process is greatly enhanced if the cooling surface in an apparatus for carrying out the process is located to a major extent, and preferably entirely, in the shadow of the melt container relative to the beams of charged particles.

According to a further feature of the invention, it is preferred, for performing the process in an economical manner and without interruption, to measure the number of pellets formed per unit time and to use the measured value for controlling the radiant energy acting on the melt in such a manner that the radiant energy and the material feed are increased when the pellet formation decreases, and vice versa. When the radiant energy is increased, the amount of starting material molten per unit time is increased, and the viscosity of the melt is also reduced. As a consequence, more drops are formed, and the output of finished pellets is correspondingly increased.

The surface of the molten metal may be heated by means of an electron beam which may be either a diffuse electron beam or a focussed electron beam which is periodically deflected in such a manner that it sequentially scans the entire melt surface. The last-mentioned heating method has the advantage of permitting local variations in the intensity of the heating effect by changing the dwell time of the incident cross section of the electron beam on the melt puddle. A periodically deflected focused electron beam may be produced not only by a single electron beam source. Several electron sources may be used for scanning respective zones of the melt puddle. It is particularly advantageous to associate a special electron beam source with the zone of the molten puddle from which the individual drops are directly withdrawn. This arrangement is particularly advantageous when the melt container is equipped with several dripping arrangements for multiplying the output of the apparatus, as will be described hereinbelow.

In order to favor release of the pellets formed, it is further proposed according to this invention that the cooling surface on which the pellets are formed perform an oscillating movement. The solidified pellets are thereby practically shaken from the cooling surface without sliding movement of the pellets on the surface, as would be the case, for example, with a mechanical stripping arrangement. It was found with the use of a mechanical stripper, that with numerous scratch tracks formed in the cooling surface after a few hours of operation that the cooling surface became useless because of increasing adhesion of the pellets to the surface. With increasing force required, material is removed from the cooling surface by wear and is mixed with the pellets so as to require purification of the latter.

The oscillating movements should preferably deviate from the course of a harmonic movement. It is preferred to achieve high values of acceleration with small amplitudes. A graphic representation of such a time against distance behavior of the cooling surface is characterized by a very steep rise of the individual pulses. This idea is carried into practice preferably by means of freely movable masses which impinge on the cooling surface or a structural element rigidly connected therewith after being accelerated over a free path in the manner of a hammer. Falling weights and/or magnetic vibrators are equally suitable for this purpose. The oscillations may be at right angles or parallel to the surface. If the cooling surface is constituted by a rotating drum or roll, the following oscillating movements are possible: axial and radial oscillations of the axis of rotation and oscillations in the direction of the drum circumference; that is, the drum-shaped cooling surface periodically exceeds and lags behind its average circumferential velocity. The amplitude and frequency of the oscillating movements are determined in such a manner as to permit ready release of the pellets without interfering with heat transmission between the pellets and the cooling surface due to movements of the pellets.

In order to multiply the output of the apparatus, the melt container may be equipped with several dripping arrangements, each equipped with an individual counter for the pellets generated, and the several counter outputs connected with a control device for varying the radiant energy, the control device being designed in such a manner that the energy output toward the area of material origin associated with a dripping arrangement is increased if pellet production from that dripping arrangement lags, and vice versa. The term "counter for the pellets generated" does not only embrace a device for counting the solidified pellets, but it is equally possible to determine their number already in the first stage of pellet formation when they are still liquid. It is possible, for example, to arrange a light barrier consisting of a light source and a light receiver along the path of descent of the drops below each dripping arrangement for recording the falling drops in individual counters, and to compare the counted value with a standard value. The output of the counting arrangement is connected with a control device which operates as follows: As long as the frequency of drop formation is the same in all dripping arrangements or optimal, no influence is exerted on the dripping speed in individual dripping arrangements. If the rate of drop formation lags in one or several dripping arrangements, the control device charges the mode of operation of the electron beam generator or generators in such a manner that drop formation is intensified in the lagging dripping arrangement. As mentioned above, the frequency of drop formation is a function of the melt viscosity. If the melt is heated more strongly at the point of drop formation, the molten material becomes more fluid, and drops are formed at a higher rate. If the counter senses the drops while still glowing, a separate light source can be dispensed with. The radiation emanating from the drops may be sensed by a detector and used for generating control pulses.

In a melt container equipped with several dripping arrangements, the entire melt cannot be fully heated for obvious reasons, and the more intensive heating of the melt must be limited locally to the area of influence of the dripping arrangements. The term "area of influence" will be understood to relate to that zone of the melt puddle in whose immediate vicinity individual drops can coalesce because of the shape of the container and the surface tension of the melt. This may be achieved, for example, by providing one or several dripping spouts extending from the edge of the container and being downwardly inclined, each spout terminating at its lowest point in a so-called dropping nose. The spout and nose jointly constitute a dripping arrangement. It is thus sufficient to heat the edge of the melt puddle more intensively in the immediate vicinity of the upper spout end in order to increase the dripping frequency. It is preferred for this purpose to associate an additional electron beam generator with the edge zone of the molten puddle near the dripping arrangements, the generator being equipped with a deflector device for periodically and sequentially scanning the areas of influence. The counter arrangement connected to the control device controls the relative dwell times of the focused electron beam on each dripping arrangement in a manner to provide uniform drop frequency.

An embodiment of the invention will be described hereinbelow with reference to the drawing which shows apparatus of the invention equipped with electron beam generators as a source of heat. It will be appreciated that plasma beam generators may be used instead with an internal pressure in the apparatus having correspondingly higher values, the operating being carried out under an inert gas atmosphere at ambient pressure or in a partial vacuum.

FIG. 3, shows the essential elements of an apparatus in cross-section, apparatus including a melt container with a cooling body, a generator for charged particles and a cooling surface.

FIG. 4 shows a melt container having a cooling body arranged in the bottom zone in cross-section view.

FIG. 5 is a top plan view of the melting container with cooling body of FIG. 3.

Figure 1:
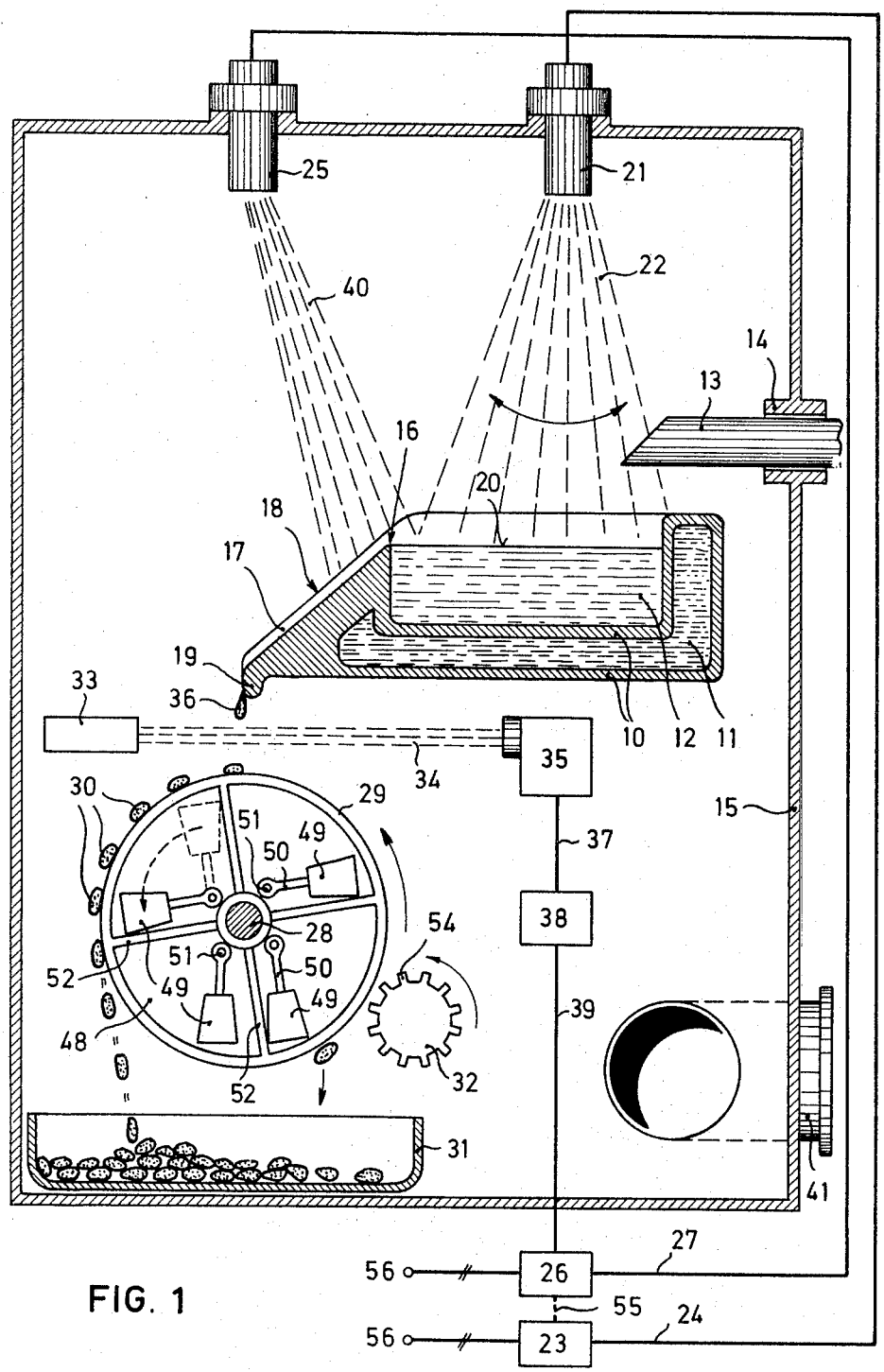
FIG. 1 is a sectional showing the melt container, cooling drum, and vacuum chamber.

As seen in FIG. 1 a double-walled melt container 10 in the form of a pan whose jacket is passed by a stream of cooling medium 11. The melt container is filled to the lowermost portion of its rim with a melt puddle 12, which in the instant case consists of titanium. Above the container and laterally outside its rim, there is a feeding device for the bar-shaped starting material 13, the feeding device being not shown for the sake of simplicity since it is of the conventional type. The starting material is introduced from the atmosphere into the interior of the vacuum chamber 15 through a vacuum seal 14 who 14 whose details are also conventional. The edge of the melt container has a depression 16 at one side which is extended into a spout 17. The spout is a portion of a plane 18 which is inclined at an angle of 15° to 60°, and terminates at its lowest point in a dropping nose 19.

An electron beam generator 21 is approximately centered above the top surface 20 of the melt and produces a fully accelerated, focused electron beam 22.

The generator 21 is additionally equipped with a device for periodically deflecting the electron beam which permits the entire surface 20 of the melt to be scanned in a line-scanning pattern. The electron beam generator is known in itself and need not be described in more detail. The electron beam generator 21 is supplied with potential for beam generation and deflection by a control device 23 by way of a conductor system 24. The control device 23, for example, causes control of the beam in such a manner that the edge zone of the melt surface 20 is more strongly heated for the purpose of compensating for heat losses to the container 10.

Spout 17 and dropping nose 19 jointly constitute a dripping arrangement with which an additional electron beam generator 25 is associated. It is built in the same manner as generator 21 and scans essentially the spout 17 and a small portion of the surface 20 in the immediate vicinity of the upper end portion of the spout 17. Electron beam generator receives potential for beam generation and deflection from an additional control device 26 and a conductor system 27. The control device 26 makes it possible to vary the drop frequency or drop output of the container in cooperation with the dripping arrangement. The control device 26 may also be provided with a supplemental output and the control device 23 with a supplemental input between which a connection may be established optionally by means of the conductor 55. The output of a counter arrangement 35/38 may be relied upon in such an event for controlling the output of the electron beam generator 21. The control devices are supplied with current through terminals 56, shown in FIG. 2.

The axis of rotation 28 of a liquid cooled cooling surface 29 is located vertically below the dropping nose 19, the surface having the shape of a cylinder. The cooling surface 29 moves in response to the drop frequency of the drippping arrangement at such a rate that the drops 30 which impinge on it and solidify barely fail to touch each other. The pellets remain on the cooling surface 29 for a predetermined period, ultimately slide from it and are collected in a receptacle 31. If, unexpectedly, one of the pellets should adhere to the cooling surface, it is removed by a rotating stripper drum 32 equipped with projections 54 which does not touch the cooling surface 29.

A light barrier consisting of a light source 33 producing a bundle of light rays 34 and a receiver 35 for the light rays is located between the dropping nose 19 and the cooling surface 29. The receiver 35 has a light sensitive cell which converts interruptions of the rays 34 by the descending drops 36 into current pulses which are fed to an evaluating device 38 by a conductor 37. The receiver 35 and the evaluating device 38 jointly constitute a counting arrangement. The actual frequency drop is compared in the counting arrangement with a predetermined reference value. Deviations from the reference value cause electrical signals to be fed to the control device 26 by the conductor 39. The signal causes a suitable change in the radiant energy and/or deflection of the electron beam 49 emanating from the electron beam generator 25. The electrical processing of the current pulse of the receiver 35 in the evaluating device 38 includes such steps as integration of the pulses over an extended period. The melt container 10, cooling surface 29, receptacle 31, stripping roller 32, light barrier and evaluating device 38 are located in the interior of the vacuum chamber 15 which is connected with a non-illustrated array of vacuum pumps by a nipple 41.

Four masses 49 which operate as falling weights are arranged on the innerfrontal surface 48 of the drum-shaped cooling surface 29 for producing an oscillating movement. The masses 49 are secured by respective linking rods 50 to pivot pins 51 arranged parallel to the axis of rotation 28 and near the same. The masses 49 are freely rotatable about the respective pins 51, the angular movement being limited in both directions by abutments 52 in the form of radial bars which divide the frontal surface 48 into four equal sectors. All masses 49 move parallel to the frontal surface 48. The masses or falling weights operate as follows: As is seen in the left lower quadrant of the surface 48, the falling weight can swing freely at first about the pivot pin 51. After the cooling surface has turned through an angle of 90°, the falling weight is carried along by the associated abutment 52 and moved through an angle of 180°. As soon as the center of gravity of the falling weight 49 passes the upper dead center in the direction of rotation of the cooling surface 29 beyond the center of the pivot pin 51, the falling weight leads the cooling surface 29 and the abutment 52 under the force of gravity and ultimately abuts against the lower abutment. The condition immediately before the fall is indicated in broken lines in the left upper quadrant of the frontal surface 48, the condition at the end of the fall in fully drawn lines. The falling weight now rests on the abutment until it reaches the lower dead center whereupon the cycle is repeated. After each rotation of the cooling surface through 90°, one of the falling weights is triggered by passage through the dead center position, and the cooling surface is caused to oscillate at high frequency by the impact in a tangential direction. The periodic impact of the falling weights is generally sufficient to cause the pellets 30 to slide from the cooling surface.

Figure 2:
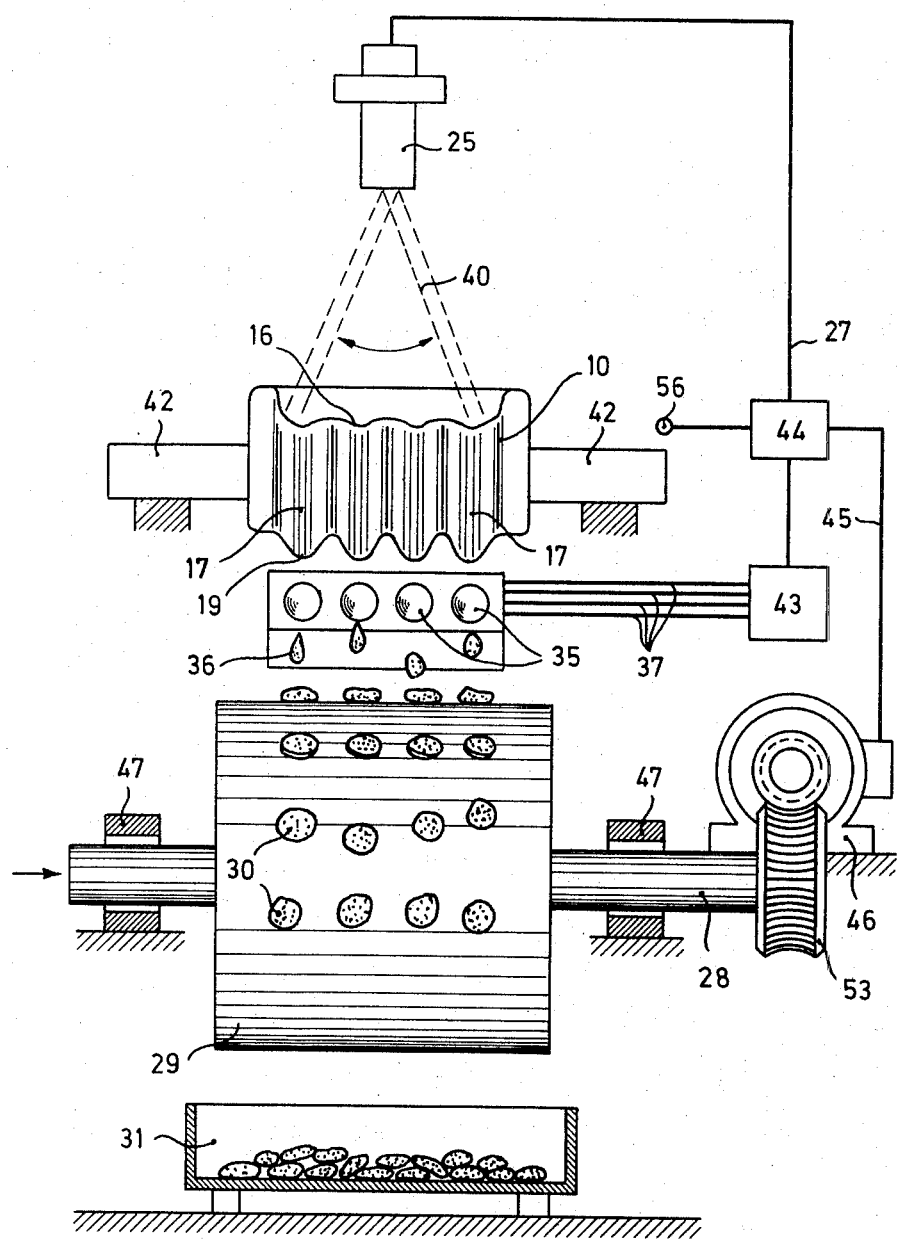
FIG. 2 is a top plan view of the melt container with dripping arrangements and counters and of the circumference of the cooling drum with its drive.

The same details are indicated in FIG. 2 with the same reference numerals as in FIG. 1. The melt container 10 is equipped with four identical spouts 17 and dropping noses 19, which are all in the area of influence of the periodically deflected electron beam 40. The melt container 10 rests on a support by means of base members 42. The multiple dripping arrangements permit the simultaneous formation of four rows of pellets on the cooling surface 29 which is of suitable width. In the path of the descending drops below each dripping arrangement, there is provided a light barrier whose receiver 35 generates separate current pulses for each path, the pulses being transmitted to the evaluating device 43 by the conductors 37. Each of the four drop frequencies is compared with a reference value in the evaluating device. A deviation of individual drop frequencies causes a corresponding change of the radiant energy and/or the deflection of the electron beam 40. For this purpose, there is provided a control device 44 which has an additional output for controlling the rotary speed of the drive motor 46 for the shaft 28 of the drum shaped cooling surface 29, being connected to the motor by a conductor 45. This additionally permits to adjust the circumferential speed of the cooling surface 29 to the drop frequency in an optimal manner. The shaft 28 of the drum-shaped cooling surface 29 is supported by two bearings 37, the drive being carried out by way of a worm wheel 53.

We claim:

1. Apparatus for preparing pellets by melting of a starting material by means of a beam of charged particles in a vacuum or under a protective gas and by subsequently solidifying individual drops of the melt on a cooling surface, comprising at least one electron beam generator, a material feeding device, a melt container with dripping arrangement, and a cooling surface arranged below the drip-pin arrangement, said cooling surface being arranged predominantly in the radiation shadow of said melt container relative to said electron beam acting on the melt.

2. Apparatus, according to claim 1, characterized in that pivoted masses are freely movable relative to the cooling surface and are associated with the same and transmit energy supplied to them to the cooling surface by abutting engagement.

3. Apparatus, according to claim 2, characterised in that the freely movable masses constitute falling weights pivotally connected to pivot pins parallel to the axis of rotation of the cooling surface by linking rods.

4. Apparatus, according to claim 3, characterized in that the melt container is provided with a plurality of dripping arrangements associated with a common beam generator with means for beam deflection, said dripping arrangements having a counting arrangement means for the formed pellets, and the output of the counting arrangement being connected to a control device for varying the radiant energy output, said control device being adapted to supply radiant energy to the area of influence, said dripping arrangement being increased relatively if pellet formation at the dripping arrangement relatively lags.

* * * * *